Patented Feb. 3, 1942

2,271,618

UNITED STATES PATENT OFFICE 2,271,618

CONVERSION OF HYDROCARBON OIL

Herman S. Bloch and Edward C. Lee, Chicago, Ill., assignors to Universal Oil Products Company, Chicago, Ill., a corporation of Delaware No Drawing. Application September 30, 1938, Serial No. 232,568

14 Claims. (Cl. 196—52)

This invention relates particularly to the conversion of hydrocarbon fractions produced in distilling petroleum oils and especially those of a distillate character which are vaporizable without substantial decomposition.

In a more specific sense the invention is concerned with a modification of hydrocarbon oil conversion processes involving the use of particular and specific types of catalysts which function to selectively promote the formation of low boiling gasoline fractions, and readily polymerizable normally gaseous olefins.

The art of cracking relatively heavy hydrocarbons to produce primarily gasoline or gas is very extensive and it is recognized that most of the basic principles of hydrocarbon decomposition by thermal treatment are known and that particular commercial processes have been developed which embody these principles. The application of catalysts, however, in cracking reactions is practically upon the same basis as it is in other fields, that is, the knowledge of what catalysts to employ when cracking different fractions from different petroleums is largely empirical and admits of no generalizations. A large number of catalysts have a tendency to accelerate reactions leading to the formation of gas rather than of gasoline, this being particularly evidenced by reduced metal catalysts such as nickel or iron and many of such catalysts are sensitive to sulfur poisoning and are quickly coated with carbonaceous materials which render them practically inert. This deposition of carbonaceous materials is many times related to the type of decomposition reactions selectively fostered by the catalyst and in general it may be said that very few if any catalysts which have been tried thus far in cracking reactions have reached a commercial status. The present invention is concerned with the use of catalytic materials which are specially adapted to accelerate the cracking of heavy fractions of petroleum and other hydrocarbonaceous materials to increase the rate of production of gasoline-boiling range fractions. The preferred catalysts are characterized by selectivity in accelerating gasoline-forming reactions rather than the gas-forming reactions, by their refractory character which enables them to retain their catalytic properties under severe conditions of temperature and pressure and by their ease and simplicity of manufacture and their exact reproducibility.

In one specific embodiment the present invention comprises subjecting hydrocarbon oil vapors at elevated temperatures and substantially atmospheric pressure to contact with catalysts comprising specially prepared silica activated by the deposition thereon of minor amounts of vanadia, these catalysts being specially adapted to produce relatively high yields of good anti-knock gasoline and gases containing relatively high percentages of readily polymerizable olefins.

As used in the present specification the term "vanadia" applies to the oxide formed under the conditions of preparation and use hereinafter described, and is the principal compound responsible for the promotional effects observed in increasing the catalytic activity of silica in catalytic reactions.

According to the present invention the distillate fractions of petroleum are cracked at temperatures within the ordinary non-catalytic cracking range, say 800 to 1200° F. but at substantially only atmospheric pressure while in contact with catalysts produced by depositing vanadia upon a relatively pure salt-free silica gel, and subsequently washing to remove soluble salts and drying to remove the major portion of combined or adsorbed water. In the catalysts thus prepared the molal ratio of silica to vanadia is usually greater than 10:1, active catalysts having been prepared in which the ratio is as high as 50:1 so that in effect the vanadia acts as a promoter of the catalytic activity of the silica in the conversion reactions. The use of the smallest amount that will give the desired effect is preferred although catalysts containing 25 to 50% vanadia are effective and are considered within the scope of this invention.

It is to be recognized that very little is known positively concerning the mechanism of promoter action in catalysis and no atempt will be made herein to offer any definite reasons for the observed effect of the addition of small amounts of vanadia to silica. There may be a mutual promoter effect or it may be that the vanadia is the more active catalyst and is extensively dispersed in and on the silica in order to present a large surface.

In manufacturing catalysts for the present process it is preferable to employ silica which has been prepared by precipitation from solution as a gel as a primary base or carrier for the support of the vanadia. The most convenient and ordinary method of preparation of such a gel is to acidify an aqueous solution of sodium silicate by the addition of the required amount of hydrochloric acid. The excess acid and the concentration of the solution in which the precipitation is brought about will determine the primary activity of the silica and its suitability for acting as a support for vanadia to produce a composite catalyst of high catalytic activity. In general the most active silica is produced by only slightly acidifying the sodium silicate, but the material formed at such a point is rather gelatinous and is filtered with difficulty. By using a moderate excess of acid, the more desirable physical characteristics in regard to catalytic activity are conserved while the "filtrability" is greatly improved. Fairly good hydrated silica for present catalytic purposes may be made by employing as high as a 20% excess of hydrochloric acid.

After precipitating the silica, it is preferably washed until substantially free from salts and acid. It is most important that substantially all traces of alkali metal compounds be removed from the silica. This may be done by washing with hydrochloric acid, ammonium chloride, or vanadyl chloride solutions. In the first case the acid seems to cause desorption of the alkali metal compounds and in the second and third cases the ammonium and vanadyl ions respectively apparently replace the alkali metal ions so that in the one case, the ammonia is lost on subsequent drying and calcining of the material, and in the other case, the net result is the addition of vanadium oxide. Obviously these three methods of washing may be followed by careful water washing to remove the soluble salts formed.

In one mode of preparing the preferred catalysts, the necessary silicic acid gel is stirred and/or heated either with a separately precipitated vanadic oxide (probably $V_2O_5.nH_2O$) which is added in the wet condition to the silica suspension, or the suspension is mixed with a solution of a soluble vanadium compound, such as, for example, a vanadyl sulfate, ammonium metavanadate, or the double sulfate of ammonium and vanadium having the formula $$VNH_4(SO_4)_2.12H_2O$$

A solution of vanadyl chloride may also be used as will be described in a later section devoted to illustrative data. From the compounds in which the vanadium acts as a base, the oxide may be precipitated by the addition of an excess of volatile bases such as ammonium hydroxide, ammonium carbonate, ammonium sulfide or organic bases and from those solutions in which it is present in the acid radical it may be precipitated by the addition of mineral acids. In any case the final precipitate comprising the hydrated silica and adsorbed or combined vanadia is finally washed to substantially complete removal of water soluble materials and dried at about 300° F. to produce a rather hard and semi-translucent material which may be ground and sized to produce particles of catalyst. Since this material is used at temperatures of the order of 800-1200° F. its water content is further reduced until after a brief period of service it amounts to but 2-3% by weight of the catalyst particles.

Although the separate precipitation of silica gel and vanadia have been described in detail, the scope of the invention should not be considered as restricted by this particular part of the procedure since the preferred catalyst may also be prepared by other methods such as, for example, the interaction of solutions of soluble alkali metal silicates with solutions of vanadium salts including soluble vanadates to simultaneously precipitate hydrated silica and hydrated vanadias.

Catalysts prepared for the process by the above general procedure evidently possess a large total contact surface corresponding to a high porosity, the pores being of such size that hydrocarbon oil vapors are able to penetrate to a considerable distance and yet not so small that when the pores become clogged with carbonaceous deposits after a long period of service, they are difficult to reactivate by oxidation. This structure is also retained after many alternate periods of use and reactivation as evidenced by the fact that catalysts may be reactivated and reused for long periods of time.

Catalysts prepared by the general procedure described in the preceding paragraphs are utilized to the best advantage as filling material in tubes or chambers in the form of small pellets or granules. In the majority of cases wherein hydrocarbon fractions readily vaporizable at moderate temperatures without extensive decomposition are employed, the average particle size is within the range of 1-10 mesh, which may apply either to small pellets of uniform size and short cylindrical shape or to particles of irregular size and shape produced by the grinding and sizing of the partially dehydrated materials. The simple method of preheating a given fraction of hydrocarbon oil vapors to a temperature suitable for their cracking in contact with the catalysts and then passing the vapors over a stationary mass of catalyst particles contained in a chamber (preferably vertical) may be employed, it may be preferable to pass the preheated vapors through banks of relatively small diameter catalyst-containing tubes in multiple connection between headers, since this arrangement of apparatus is better adapted to permit exterior heating of the catalyst tubes to compensate for the heat loss in the endothermic cracking reactions.

After the passage of the oil vapors over the catalyst, the products may be separated into heavy residual materials unsuitable for further cracking on account of their coke-forming tendencies, intermediate insufficiently converted fractions amenable to further catalytic cracking, gasoline boiling range materials and fixed gases, the intermediate fractions being returned directly to admixture with the charging stock so that ultimately there is complete recycling of all fractions and maximum utilization of the charging stock for gasoline production.

The present process besides being characterized by the use of novel catalysts is further characterized by the use of moderate temperatures, relatively low pressures and high throughputs in comparison with strictly thermal cracking processes in use at the present time. When dealing with intermediate distillate fractions of the character of gas oil, temperatures not greatly in excess of 900° F. are usually used in the catalytic conversion zone, approximately 1200° F. being however the upper limit temperature which is employed in practice. In the matter of pressure, it is seldom desirable to employ pressures materially above atmospheric except in so far as this is necessary to insure a proper flow through the vaporizing and cracking zones and the succeeding fractionating equipment. However, since the pressure increases the capacity of both cracking and fractionating units, moderately superatmospheric pressures may be employed when their use is dictated by the overall economy of the process. The times of catalytic contact are relatively short and usually of the order of 10 seconds or less.

The following example of the preparation and use of catalysts peculiar to the present invention is given to indicate the novelty and utility of the present process in comparison with ordinary high-pressure cracking processes although not for the purpose of limiting the invention in exact agreement with the data introduced.

In the preparation of a catalyst, a silica gel was first precipitated, filtered and water washed, then further treated with ammonium chloride and water washed to substantially replace and remove alkali metal ions from the precipitated silica gel. Three moles of the purified silica gel were slurried in three liters of water and to this was added 0.12 mole of ammonium vanadate suspended in 1½ liters of water. Hydrochloric acid was then added while agitating to just acidify the alkaline solution and precipitate the vanadic acid in the presence of the silica gel. The suspension was then filtered and the filter cake dried at approximately 300° F. to produce a solid material which was then formed into particles of 6 to 10 mesh. These were calcined at 900° F. before contacting with the hydrocarbon vapors.

The catalyst as prepared was placed in a catalytic reaction chamber and a Pennsylvania gas oil was vaporized at a pressure slightly above atmospheric and the vapors were heated to a temperature of about 930° F. and passed through the catalyst granules. In a once-through operation there was produced a 20% yield of 76 octane number gasoline which was separated by fractionation, the unconverted material of high boiling range being recycled to produce an ultimate yield of approximately 61 per cent. There was produced in addition 10 per cent by weight of the charge of readily polymerizable olefins so that the ultimate recycle yield of gasoline was increased to about 71%.

We claim as our invention:

1. A process for converting hydrocarbon distillates containing substantially no gasoline into substantial yields of gasoline and readily polymerizable normally gaseous olefinic hydrocarbons, which comprises subjecting said distillates at a temperature of the order of 900–1200° F. and substantially atmospheric pressure to contact with catalytic material comprising essentially silica gel and precipitated vanadia, said silica gel having been precipitated by acidification of an alkali metal silicate solution and substantially completely freed of alkali metal ions by treatment with an aqueous solution of a compound having a cation capable of replacing alkali metal ions.

2. A process for converting hydrocarbon distillates containing substantially no gasoline into substantial yields of gasoline and readily polymerizable normally gaseous olefinic hydrocarbons, which comprises subjecting said distillate at a temperature of the order of 800–1200° F. and substantially atmospheric pressure to contact with catalytic material produced by separately precipitating silica gel from an alkali metal silicate solution, freeing the silica gel substantially completely of alkali metal ions by treating the same with an aqueous solution of a compound having a cation capable of replacing alkali metal ions, adding to the silica gel precipitated vanadia, and heating the composite to remove a major portion of its water content.

3. A process for converting hydrocarbon distillates containing substantially no gasoline into substantial yields of gasoline and readily polymerizable normally gaseous olefinic hydrocarbons, which comprises subjecting said distillate at a temperature of the order of 800–1200° F. and substantially atmospheric pressure to contact with catalytic material produced by separately precipitating silica gel by acidifying an aqueous solution of an alkali metal silicate and freeing said gel substantially completely of alkali metal ions by treatment thereof with an aqueous solution of a compound having a cation capable of replacing alkali metal ions, adding thereto vanadia produced by adding an alkaline precipitant to an aqueous solution of a vanadium salt and purified by washing to remove soluble salts, and heating and calcining the composite to remove a major portion of combined water.

4. A process for converting hydrocarbon distillates containing substantially no gasoline into substantial yields of gasoline and readily polymerizable normally gaseous olefinic hydrocarbons, which comprises subjecting said distillate at a temperature of the order of 800–1200° F. and substantially atmospheric pressure to contact with catalytic material produced by separately precipitating silica gel from an alkali metal silicate solution, freeing the silica gel substantially completely of alkali metal ions by treating the same with an aqueous solution of a compound having a cation capable of replacing alkali metal ions, adding to the silica gel precipitated vanadia, heating the composite to remove a major portion of its water content, producing particles of a definite size and further heating at a temperature above 900° F. to reduce the total water content thereof to below 5% by weight.

5. A process for converting hydrocarbon distillates containing substantially no gasoline into substantial yields of gasoline and readily polymerizable normally gaseous olefinic hydrocarbons, which comprises subjecting said distillate at a temperature of the order of 800–1200° F. and substantially atmospheric pressure to contact with catalytic material produced by separately precipitating silica gel by acidifying an aqueous solution of an alkali metal silicate, then filtering and washing said silica gel with hydrochloric acid and water to remove substantially all soluble substances, suspending the washed silica in water, adding thereto vanadia produced by adding a volatile alkaline precipitant to an aqueous solution of a vanadium salt, thoroughly mixing the suspension of silica and vanadia, filtering and washing the suspended material to remove soluble substances, heating the washed material to remove a major portion of its water content, producing particles of a definite size and further heating at a temperature above 900° F. to reduce total water content to below 5%.

6. A process for converting hydrocarbon distillates containing substantially no gasoline into substantial yields of gasoline and readily polymerizable normally gaseous olefinic hydrocarbons, which comprises subjecting said distillate at a temperature of the order of 800–1200° F. and substantially atmospheric pressure to contact with catalytic material produced by separately precipitating silica gel by acidifying an aqueous solution of an alkali metal silicate, then filtering and washing with hydrochloric acid and water to remove substantially all soluble substances, suspending said washed silica in a solution of a vanadium salt, precipitating alkali metal-free vanadia from the solution onto the suspended silica to effect the addition of vanadia to silica, filtering the suspended material and washing to remove soluble substances, heating to remove a major portion of the total water content, producing particles of a definite size and further heating at a temperature above 800° F. to reduce total water content to below 5%.

7. A process for converting hydrocarbon distillates containing substantially no gasoline into substantial yields of gasoline and readily polymerizable normally gaseous olefinic hydrocarbons, which comprises subjecting said distillate at a temperature of the order of 800–1200° F. and substantial atmospheric pressure to contact with catalytic material produced by separately precipitating silica gel by acidifying an aqueous solution of an alkali metal silicate, filtering and washing said silica gel with ammonium chloride solution and further washing with water, suspending said washed silica gel in a solution of a vanadium salt, precipitating vanadia from the solution onto the suspended silica to effect the addition of vanadia to silica, filtering and washing the suspended material to remove soluble substances, heating to remove a major portion of the total water content, producing particles of a definite size, and further heating at a temperature above 900° F. to reduce total water content to below 5%.

8. A process for converting hydrocarbon distillates containing substantially no gasoline into substantial yields of gasoline and readily polymerizable gaseous olefinic hydrocarbons, which comprises subjecting said distillate at a temperature of the order of 800–1200° F. and substantially atmospheric pressure to contact with catalytic material produced by separately precipitating silica gel by acidifying an aqueous solution of an alkali metal silicate, and filtering and washing said silica gel with hydrochloric acid and water to remove substantially all soluble substances, suspending the washed silica in water, adding thereto vanadia produced by adding an alkaline precipitant selected from the group consisting of ammonium hydroxide, ammonium carbonate, ammonium sulfide and organic bases to an aqueous solution of a vanadium salt, filtering and washing the suspended material to remove soluble substances, heating the washed material to remove a major portion of its total water content, producing particles of a definite size and further heating at a temperature above 900° F. to reduce total water content to below 5%.

9. A process for converting hydrocarbon distillates containing substantially no gasoline into substantial yields of gasoline and readily polymerizable normally gaseous olefinic hydrocarbons, which comprises subjecting said distillate at a temperature of the order of 800–1200° F. and substantially atmospheric pressure to contact with catalytic material produced by adding to an aqueous solution of an alkali metal silicate an aqueous solution containing a sufficient quantity of hydrochloric acid and vanadium salt to precipitate a silica gel by the acidification of said alkali metal silicate, filtering the composite precipitate comprising hydrated silica and hydrated vanadia, freeing said composite precipitate substantially completely of alkali metal ions, heating the thus purified material to remove a major portion of its total water content, producing particles of definite size, and heating at a temperature above 900° F. to reduce total water content to less than 5% by weight.

10. A process for the production of gasoline from hydrocarbon oils heavier than gasoline which comprises contacting the oil at cracking temperature with a calcined mixture of silica gel and precipitated vanadia, said silica gel having been precipitated by acidification of an alkali metal silicate solution and substantially completely freed of alkali metal ions by treatment with an aqueous solution of a compound having a cation capable of replacing alkali metal ions.

11. A process for the production of gasoline from hydrocarbon oils heavier than gasoline which comprises contacting the oil at cracking temperature with a calcined mixture of silica gel and a minor proportion of precipitated vanadia, said silica gel having been precipitated by acidification of an alkali metal silicate solution and substantially completely freed of alkali metal ions by treatment with an aqueous solution of a compound having a cation capable of replacing alkali metal ions.

12. The process as defined in claim 10 further characterized in that the silica gel is treated with hydrochloric acid as said aqueous solution.

13. The process as defined in claim 10 further characterized in that said compound is ammonium chloride.

14. A process for the production of gasoline from hydrocarbon oils heavier than gasoline which comprises contacting the oil at cracking temperature with a calcined mixture of the hydrogels of silica and vanadia, said mixture being substantially completely free of alkali metal ions.

HERMAN S. BLOCH.
EDWARD C. LEE.